(12) United States Patent
Choi et al.

(10) Patent No.: US 12,083,535 B2
(45) Date of Patent: Sep. 10, 2024

(54) MODULAR ELECTROSTATIC PRECIPITATOR

(71) Applicant: AweXome Ray, Inc., Anyang-si (KR)

(72) Inventors: Hong Sue Choi, Anyang-si (KR); Jun Young Choi, Anyang-si (KR); Se Hoon Gihm, Anyang-si (KR); Sung Hyun Bae, Anyang-si (KR); Nam Kyu Lee, Anyang-si (KR); Ki Hoon Yoon, Anyang-si (KR); Chang Hyun Kim, Anyang-si (KR)

(73) Assignee: AweXome Ray, Inc., Anyang-si (KR)

( * ) Notice: Subject to any disclaimer, the term of this patent is extended or adjusted under 35 U.S.C. 154(b) by 345 days.

(21) Appl. No.: 17/450,615

(22) Filed: Oct. 12, 2021

(65) Prior Publication Data
US 2022/0111400 A1  Apr. 14, 2022

(30) Foreign Application Priority Data

Oct. 12, 2020  (KR) .......................... 10-2020-0131161

(51) Int. Cl.
*B03C 3/12* (2006.01)
*B03C 3/47* (2006.01)
*B03C 3/82* (2006.01)

(52) U.S. Cl.
CPC ............... *B03C 3/12* (2013.01); *B03C 3/47* (2013.01); *B03C 3/82* (2013.01)

(58) Field of Classification Search
CPC .... B03C 3/04; B03C 3/08; B03C 3/12; B03C 3/383; B03C 3/41; B03C 3/45;
(Continued)

(56) References Cited

U.S. PATENT DOCUMENTS 3,626,668 A * 12/1971 Cardiff .................... B03C 3/155
  55/318
3,626,669 A * 12/1971 Cardiff .................... B03C 3/155
  55/318

(Continued)

FOREIGN PATENT DOCUMENTS

JP    09-019646 A    1/1997
JP    2010-069348 A    4/2010
(Continued)

OTHER PUBLICATIONS

Office Action in KR Application No. 10-2020-0131161 in 9 pages issued Jan. 5, 2022.

*Primary Examiner* — Christopher P Jones
*Assistant Examiner* — Sonji Turner
(74) *Attorney, Agent, or Firm* — Knobbe, Martens, Olson & Bear, LLP (57) ABSTRACT

This application relates to a modular electrostatic precipitator. In one aspect, the modular electrostatic precipitator includes a housing providing a flow path through which air is moved and a charging module configured to emit electromagnetic waves to the air. The precipitator may also include a first attaching/detaching unit configured to attach and detach the charging module to and from the housing and a particle collecting module configured to collect particles in the air by applying an electrostatic force to the air. The precipitator may further include a second attaching and detaching unit configured to attach and detach the particle collecting module to and from the housing.

16 Claims, 12 Drawing Sheets

(58) Field of Classification Search
CPC .... B03C 3/47; B03C 3/82; B03C 3/86; B03C 2201/08; Y02A 50/2351
See application file for complete search history.

(56) References Cited

U.S. PATENT DOCUMENTS

| | | | | |
|---|---|---|---|---|
| 4,332,597 A * | 6/1982 | Wooldridge | | B03C 3/86 96/54 |
| 4,363,640 A * | 12/1982 | Avondoglio | | B03C 3/76 96/35 |
| 4,662,690 A * | 5/1987 | Genereaux | | A47B 88/48 312/274 |
| 5,437,713 A * | 8/1995 | Chang | | B03C 3/743 96/87 |
| 5,641,342 A * | 6/1997 | Smith | | B03C 3/025 55/506 |
| 5,656,242 A * | 8/1997 | Morrow | | A61L 9/20 422/120 |
| 5,902,552 A * | 5/1999 | Brickley | | A61L 2/10 362/267 |
| 5,993,738 A * | 11/1999 | Goswani | | B03C 3/60 422/4 |
| 6,272,972 B1 * | 8/2001 | Kim | | F15B 15/1471 92/137 |
| 6,623,544 B1 * | 9/2003 | Kaura | | B03C 3/011 55/DIG. 32 |
| 6,676,721 B1 * | 1/2004 | Gillingham | | B01D 46/0086 55/497 |
| 6,849,107 B1 * | 2/2005 | Huffman | | B01D 46/521 261/80 |
| 6,872,237 B2 * | 3/2005 | Gillingham | | B01D 46/0086 95/20 |
| 6,902,603 B2 * | 6/2005 | Wiser, III | | B01D 46/10 55/506 |
| 6,908,494 B2 * | 6/2005 | Gillingham | | B01D 46/46 95/20 |
| 7,326,387 B2 * | 2/2008 | Arts | | B01D 53/007 422/186.3 |
| 7,332,019 B2 * | 2/2008 | Bias | | B03C 3/72 96/26 |
| 7,351,274 B2 * | 4/2008 | Helt | | B03C 3/12 96/26 |
| 7,608,135 B2 * | 10/2009 | Mello | | B03C 3/09 96/99 |
| 7,740,686 B2 * | 6/2010 | Metteer | | B01D 53/75 422/186.13 |
| 7,914,604 B2 * | 3/2011 | Mello | | B03C 3/155 95/79 |
| 8,047,198 B2 * | 11/2011 | Meyer | | F24C 15/026 49/113 |
| 8,388,731 B2 * | 3/2013 | Metteer | | B01D 53/32 422/123 |
| 8,562,913 B2 * | 10/2013 | Searle | | A61L 9/16 422/121 |
| 8,845,782 B2 * | 9/2014 | Metteer | | A61L 9/12 95/55 |
| 9,393,338 B2 * | 7/2016 | Livchak | | F28F 1/12 |
| 9,468,699 B2 * | 10/2016 | Park | | F25D 17/04 |
| 9,696,049 B2 * | 7/2017 | Metteer | | B01D 53/32 |
| 11,052,168 B2 * | 7/2021 | Kirschman | | A61L 2/0023 |
| 2004/0139707 A1 * | 7/2004 | Gillingham | | B01D 46/58 55/302 |
| 2004/0144253 A1 * | 7/2004 | Gillingham | | F02M 35/024 95/280 |
| 2005/0166559 A1 * | 8/2005 | Gillingham | | F02M 35/024 55/502 |
| 2017/0023265 A1 * | 1/2017 | Park | | F24F 8/22 |
| 2022/0065463 A1 * | 3/2022 | Shingler | | F24C 15/205 |

FOREIGN PATENT DOCUMENTS

| | | | |
|---|---|---|---|
| KR | 10-0512129 B1 | | 9/2005 |
| KR | 20060112001 A | * | 10/2006 |
| KR | 20060112491 A | * | 11/2006 |
| KR | 10-0710494 B1 | | 4/2007 |
| KR | 10-2008-0088850 A | | 10/2008 |
| KR | 20080088850 A | * | 10/2008 |
| KR | 100910842 B1 | * | 8/2009 |
| KR | 10-1112002 B1 | | 2/2012 |
| KR | 101342101 B1 | * | 12/2013 |
| WO | WO-2017179743 A1 | * | 10/2017 |
| WO | WO-2020059936 A1 | * | 3/2020 ............... B03C 3/34 |

* cited by examiner

MODULAR ELECTROSTATIC PRECIPITATOR

CROSS-REFERENCE TO RELATED APPLICATION

This application claims priority to Korean Patent Application No. 10-2020-0131161 filed on Oct. 12, 2020. The entire contents of the application on which the priority is based are incorporated herein by reference.

BACKGROUND

Technical Field

The present disclosure relates to a modular electrostatic precipitator, and more particularly, to a modular electrostatic precipitator in which a charging module or a particle collecting module can be easily replaced.

Description of Related Technology

In cement factories or thermal power plants, a large amount of particles are generated during the operation thereof, and a particle collector or the like is widely used to prevent air pollution due to a large amount of particles.

The particle collector collects particles to prevent the discharge of the particles generated in factories or power plants to the outside. In general, an electrostatic precipitator operates in a manner that ionized particles contained in air using corona discharge, and purifies air by collecting the ionized particles using static electricity or the like.

SUMMARY

The present disclosure provides a modular electrostatic precipitator capable of minimizing external emission of electromagnetic waves and enabling easy attachment and detachment of a charging module and a particle collecting module.

However, aspects of the present disclosure are not limited to those mentioned herein, and other aspects that are not mentioned can be clearly understood by those of ordinary skill in the art to which the present disclosure belongs from the following description.

In accordance with an embodiment of the present disclosure, there is provided a modular electrostatic precipitator including: a housing providing a flow path through which air is moved; a charging module configured to emit electromagnetic waves to the air; a first attaching/detaching unit configured to attach and detach the charging module to and from the housing; a particle collecting module configured to collect particles in the air by applying an electrostatic force to the air; and a second attaching and detaching unit configured to attach and detach the particle collecting module to and from the housing.

The charging module may be mounted on a side of an inlet of the housing through which the air is introduced, wherein the particle collecting module is mounted on a side of an outlet of the housing through which the air is discharged, and wherein fine particles in the air introduced into the housing are ionized by the charging module, and the ionized fine particles are collected by the electrostatic force on a particle collecting plate of the particle collecting module.

The first attaching/detaching unit may include: a sliding bracket extending to be bent from a lower portion of the charging module; and a guide rail configured to guide a movement of the sliding bracket when the charging module is attached to and detached from the housing, the guide rail being installed at the housing to correspond to the sliding bracket.

The sliding bracket may include: a vertical bracket portion vertically extended in each edge of both sides of a bottom portion of the charging module; and a horizontal bracket portion bent and extended from the vertical bracket portion toward an inner side of the charging module.

The guide rail may include: a fixed rail portion fixedly installed at the housing; a vertical rail portion extending in a vertical direction from the fixed rail portion; and a horizontal rail portion bent and extended from the vertical rail portion toward the inner side of the charging module to enable sliding movement of the horizontal bracket portion while being restricted to the horizontal rail portion.

The second attaching/detaching unit may include: a particle collecting bracket installed at an upper portion of the particle collecting module; and a housing bracket mounted at a lower portion of the housing.

The second attaching/detaching unit may further include: an operating cylinder connected between the particle collecting bracket and the housing bracket to apply a moving force to the particle collecting module in the attachment/detachment direction of the particle collecting module when the particle collecting module is attached to and detached from the housing.

An upper end of the operating cylinder may be hingedly coupled to one end of the particle collecting bracket, and a lower end of the operating cylinder may be hingedly coupled to a center of the housing bracket, so that the operating cylinder may be rotated along an arc trajectory with the center of the housing bracket as a rotation center when the charging module is attached to and detached from the housing.

The second attaching/detaching unit may further include: a particle collection rail mounted at an upper portion of the particle collecting module to extend in the attachment/detachment direction of the particle collecting module; and a housing rail installed at an upper portion of the housing to correspond to the particle collection rail, the housing rail supporting the particle collection rail to be slidably moved when the particle collecting module is attached to and detached from the housing.

The charging module may include: a charging case detachably mounted to the housing through the first attaching/detaching unit; an electromagnetic wave tube provided in the charging case to emit electromagnetic waves toward the air; and a power supply, installed in the charging case, for supplying power to the electromagnetic wave tube.

The particle collecting module may include: a plurality of particle collecting plates disposed to be spaced apart from each other in a width direction of the flow path, ionized fine particles being moved between the plurality of particle collecting plates; and a particle collecting electrode for applying power to the particle collecting plates to generate an electrostatic force on the particle collecting plates.

The particle collecting module may further include: an upper plate to which upper portions of the plurality of particle collecting plates are coupled; a lower plate to which lower portions of the plurality of particle collecting plates are coupled; and reinforcing pipes connected between opposite end portions of the upper plate and opposite end portions of the lower plate.

The particle collecting module may further include: gap reinforcement bars that fix both side edges of the plurality of particle collecting plates so that a distance between the plurality of the adjacent particle collecting plates is maintained constant.

An upper slit through which at least part of the upper portions of the plurality of particle collecting plates pass may be formed in the upper plate, a lower slit through which at least part of the lower portions of the plurality of particle collecting plates pass is formed in the lower plate, and the particle collecting electrode is electrically connected to the at least parts of the upper portion and the lower portion of the particle collecting plates protruding through the upper slit and the lower slit.

The charging module may sterilize microorganisms in the air and ionize fine particles in the air, and the particle collecting module may remove the ionized microorganisms through electrical attraction by the electrostatic force.

According to the present disclosure, since the charging module and the particle collecting module can be attached to and detached from the electrostatic precipitator, the charging module and the particle collecting module can be replaced or upgraded quickly and efficiently.

Further, according to the present disclosure, since electromagnetic waves are emitted to fine particles in the air, it is possible to solve the ozone generation problem due to corona discharge, to achieve charge balance when ionizing the fine particles included in the polluted air, and to adjust the tube voltage in accordance with the pollution degree of the polluted air. Accordingly, the particle collection efficiency can be increased and the power efficiency can be improved.

In addition, according to the present disclosure, it is possible to reduce the emission of electromagnetic waves harmful to the human body to the outside of the electrostatic precipitator by minimizing the mechanical gap of the electrostatic precipitator.

DETAILED DESCRIPTION

When it is necessary to replace a particle collecting plate used for particle collection or an electronic device for ionizing the particles, the particle collecting plate or the electronic device is removed from the particle collector in a state that the particle collector is disassembled as a whole, and then a new one is installed in the particle collector and the particle collector is reassembled. Therefore, a series of operations for replacing the particle collecting plate or the electronic device may take a lot of time.

In addition, even when an additional upgrade is required for the configuration of any one of the particle collecting plate or the electronic device, the upgrade work needs to be performed in the state the particle collector is disassembled as a whole, which may be complex and cumbersome work for skilled workers as well as unskilled workers.

In particular, in the case of an electrostatic precipitator that uses electromagnetic waves (e.g., X-ray and the like) harmful to a human body, if the electromagnetic waves discharged out of the electrostatic precipitator may have adverse effects on human bodies.

Hereinafter, with reference to the accompanying drawings, the configuration and operation according embodiments of the present disclosure will be described in detail. The following description is one of several aspects of the present disclosure that can be claimed, and the following description may form a part of the detailed description of the present disclosure.

However, in describing the present disclosure, detailed descriptions of known configurations or functions may be omitted for clarity of the present disclosure.

Since the present disclosure may include various embodiments and various modifications, specific embodiments are illustrated in the drawings and described in the detailed description. However, this is not intended to limit the present disclosure to a specific embodiment, it should be understood to include all modifications, equivalents and substitutes included in the spirit and scope of the present disclosure.

Terms including ordinal numbers, such as first and second, may be used for describing various elements, but the corresponding elements are not limited by these terms. These terms are only used for the purpose of distinguishing one element from another element.

When an element is referred to as being 'connected' to, or 'accessed' to another element, it should be understood that the element may be directly connected to, or accessed to another element, but that other elements may exist in the middle.

The terms used in the present disclosure are only used for describing specific embodiments, and are not intended to limit the present disclosure. Singular expressions include plural expressions unless the context clearly indicates otherwise.

An exemplary embodiment of the present disclosure will be described in more detail with reference to the accompanying drawings.

Figure 1:
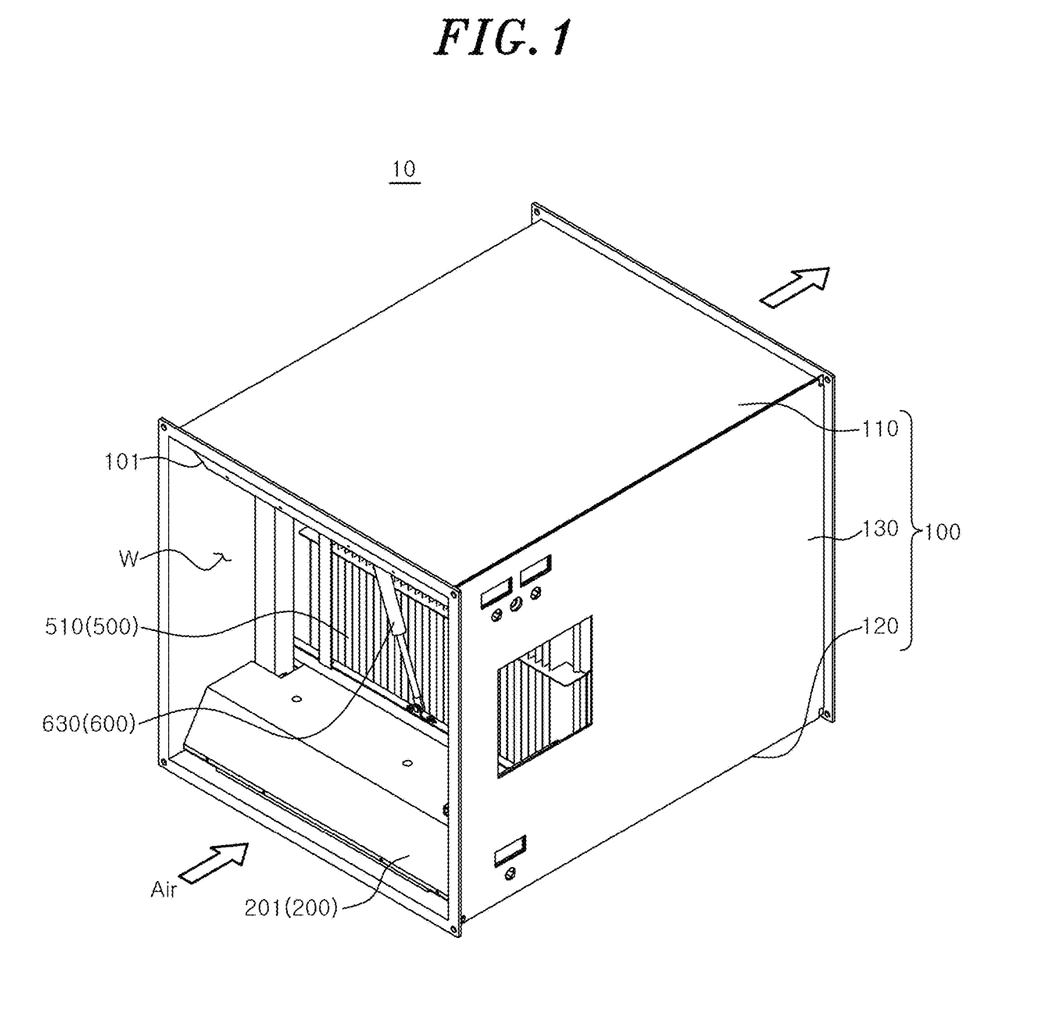
FIG. 1 is a perspective view showing a modular electrostatic precipitator according to a first embodiment of the present disclosure.
Figure 2:
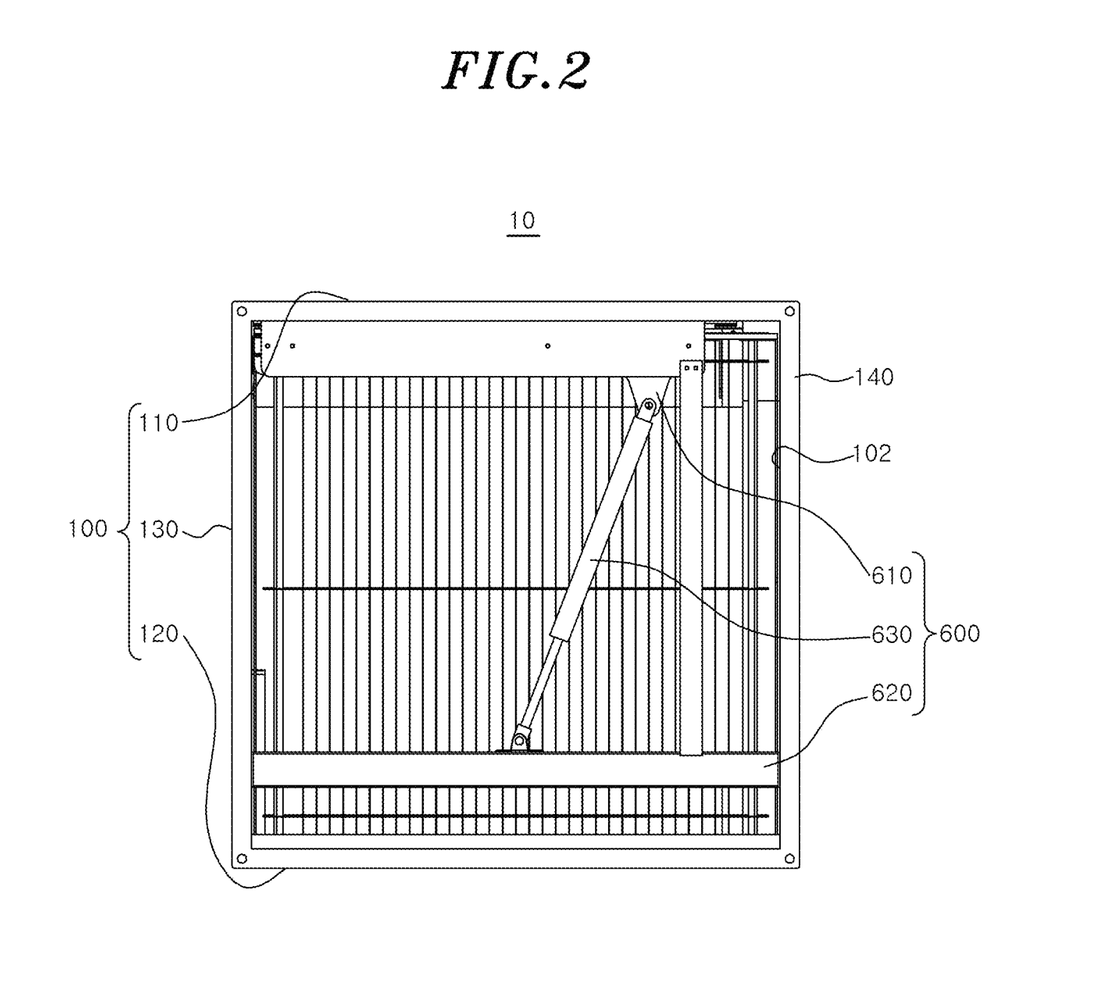
FIG. 2 is a rear view showing the rear side of the modular electrostatic precipitator shown in FIG. 1.
Figure 3:
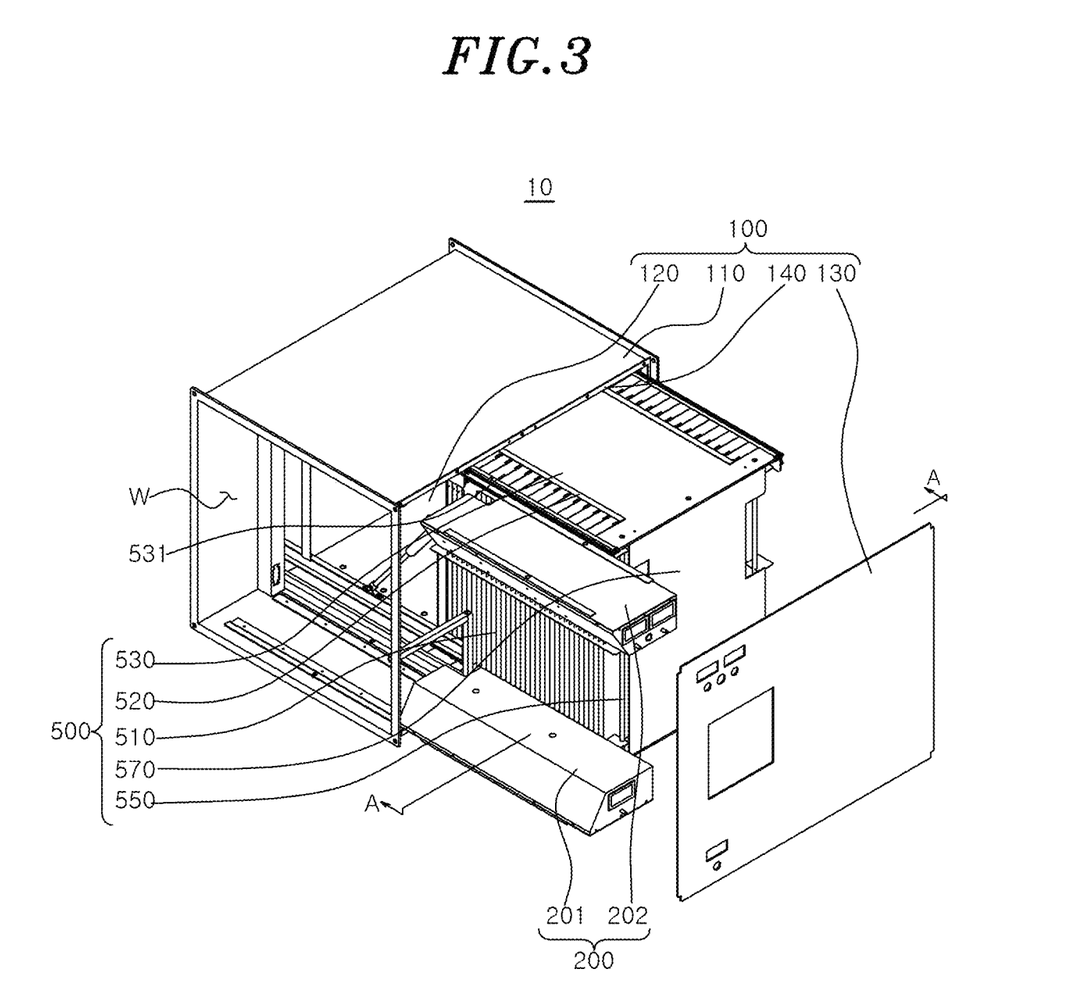
FIG. 3 is a perspective view of the modular electrostatic precipitator in which a charging module and a particle collecting module are disassembled therefrom as viewed from above.
Figure 4:
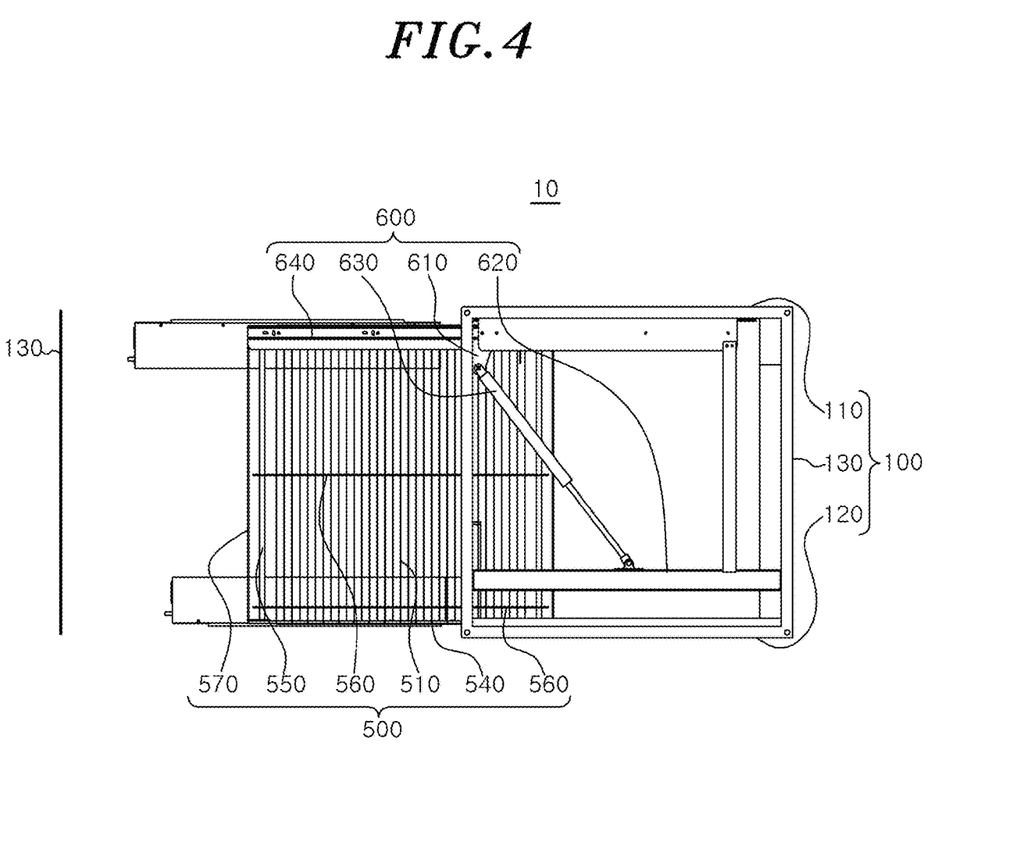
FIG. 4 is a rear view showing the rear side of the modular electrostatic precipitator shown in FIG. 3.
Figure 5:
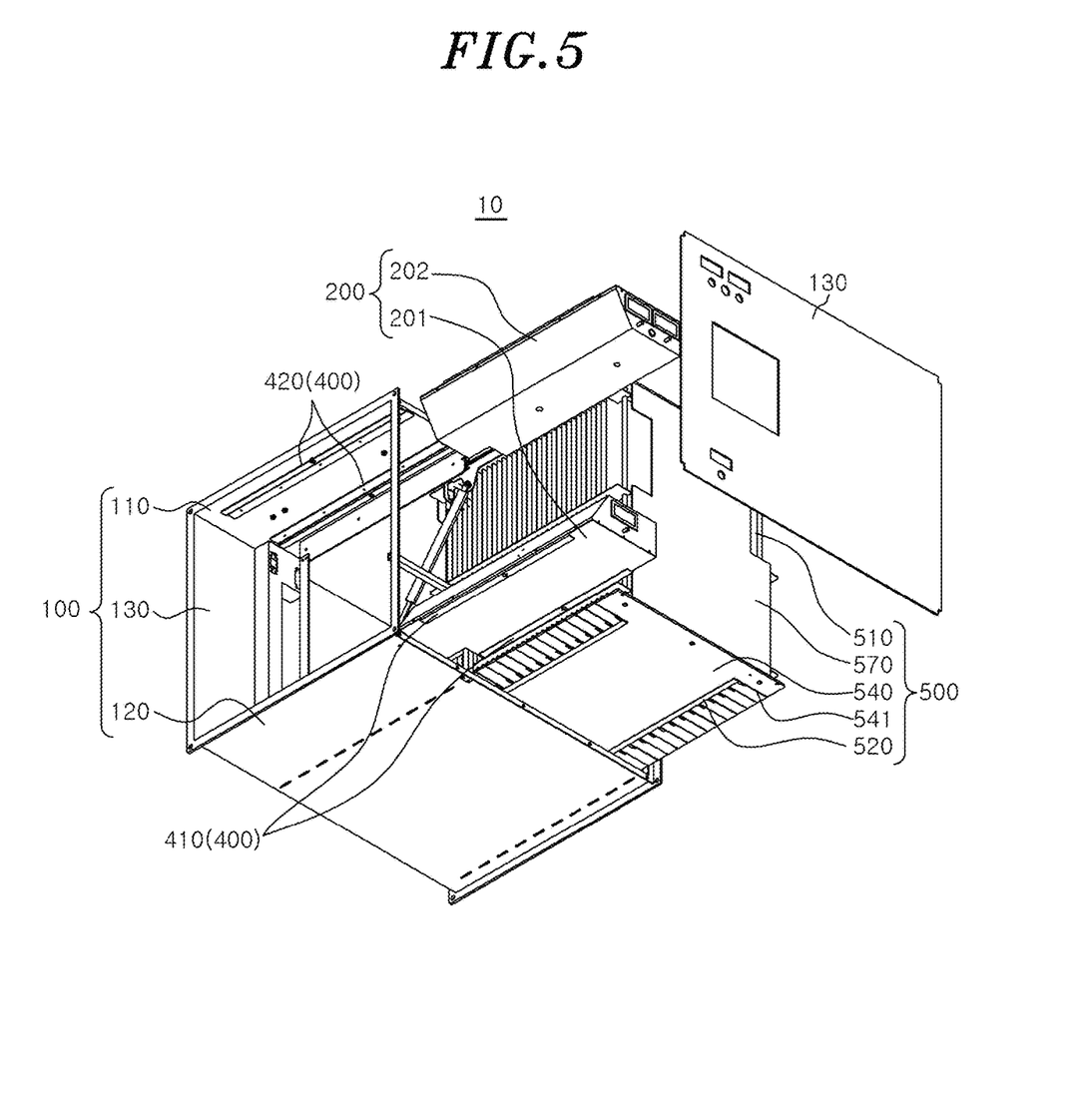
FIG. 5 is a perspective view of the modular electrostatic precipitator in which the charging module and the particle collecting module are disassembled therefrom as viewed from below.
Figure 6:
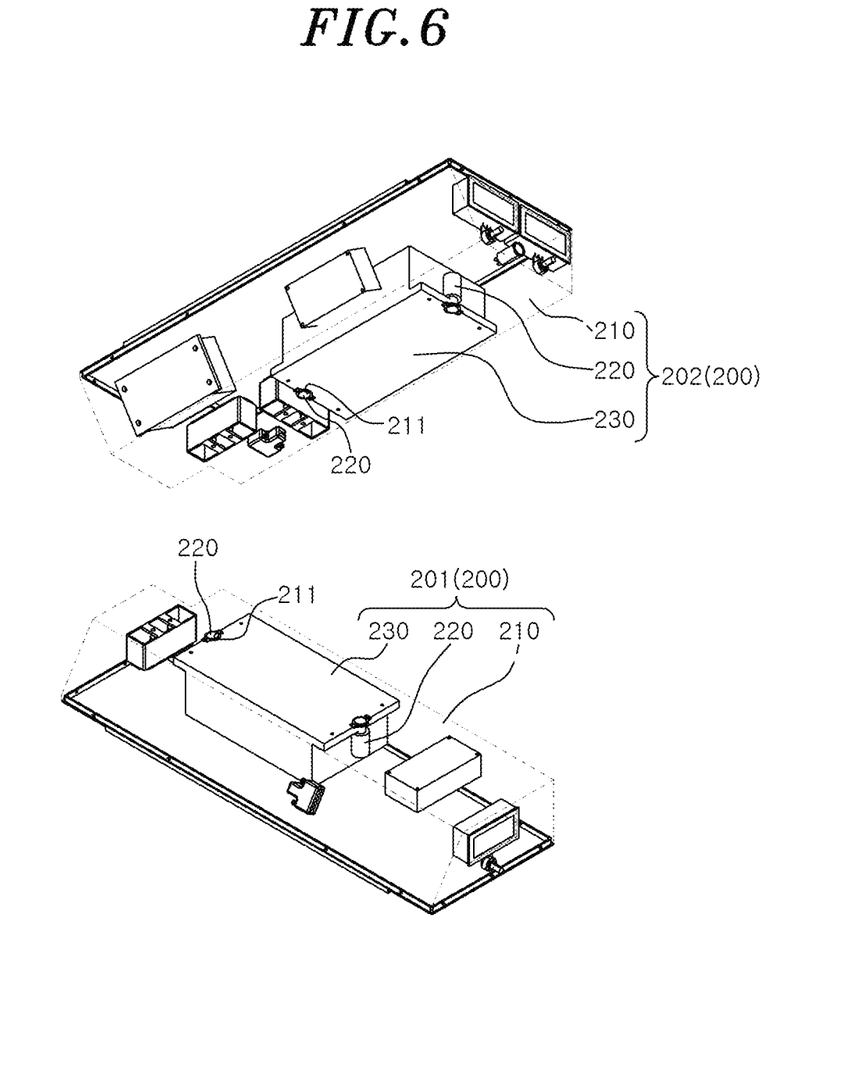
FIG. 6 is a perspective view showing a lower module and an upper module which are separated in the modular electrostatic precipitator.

FIG. 1 is a perspective view showing a modular electrostatic precipitator according to a first embodiment of the present disclosure; FIG. 2 is a rear view showing the rear side of the modular electrostatic precipitator shown in FIG. 1; FIG. 3 is a perspective view of the modular electrostatic precipitator in which a charging module and a particle collecting module are disassembled therefrom as viewed from above; FIG. 4 is a rear view showing the rear side of the modular electrostatic precipitator shown in FIG. 3; FIG. 5 is a perspective view of the modular electrostatic precipitator in which the charging module and the particle collecting module are disassembled therefrom as viewed from below; and FIG. 6 is a perspective view showing a lower module and an upper module separated in the modular electrostatic precipitator.

Referring FIGS. 1 to 6, a modular electrostatic precipitator 10 according to the first embodiment of the present disclosure includes a housing 100, a charging module 200, a first attaching/detaching unit 400, and a particle collecting module 500 and a second attaching/detaching unit 600.

Specifically, the housing 100 may constitute an overall appearance of the modular electrostatic precipitator 10. An inlet 101 through which air is introduced may be provided at a front end of the housing 100, and an outlet 102 through which air is discharged may be provided at a rear end of the housing 100. A flow path W through which air moves may be provided inside the housing 100. The flow path W may serve as a passage through which air moves between the inlet 101 and the outlet 102.

The housing 100 includes a space in which the charging module 200, the first attaching/detaching unit 400, the particle collecting module 500, and the second attaching/detaching unit 600 are installed. For example, a space in which the charging module 200 and the first attaching/detaching unit 400 are installed may be provided on the side of the inlet 101 of the housing 100, and a space in which the particle collecting module 500 and the second attaching/detaching unit 600 are installed may be provided on the side of the outlet 102 of the housing 100.

The housing 100 includes an upper plate 110, a lower plate 120, a support frame 140, and side plates 130. The upper plate 110, the lower plate 120, and the side plates 130 are assembled to maintain a sealed state to prevent the electromagnetic waves generated by the charging module 200 from leaking to the outside. The support frame 140 may be provided in a form of a square frame connecting the upper plate 110 and the lower plate 120. The side plates 130 may be coupled to the support frame 140 through bolts.

A power socket for electrically connecting an external power source to the charging module 200 and the particle collecting module 500 may be provided in any one or each of the side plates 130 of the housing 100. Further, an instrument panel and a display for measuring and displaying various states of the air in the housing 100 may be provided at the side plates 130 of the housing 100. In particular, since the side plates 130 are assembled to the support frame 140 through bolts, when replacement or upgrade of the charging module 200 and the particle collecting module 500 is required, the side plates 130 can be easily detached from the support frame after the bolts are removed.

The charging module 200 may emit electromagnetic waves to the flow path W so that fine particles in the air are ionized. Here, the fine particles may include particles in the form of dust and particulate matter and gas molecules such as viruses or total volatile organic compounds (TVOC). In the present embodiment, the fine particles may refer to any objects to be collected from polluted air by using the modular electrostatic precipitator 10 for the purification of the polluted air.

The charging module 200 includes a first charging module 201 installed at a lower portion on the side of the inlet 101 in the housing 100 and a second charging module 202 installed at an upper portion on the side of the inlet 101 in the housing 100. The first charging module 201 and the second charging module 202 may be disposed to face each other in the up-down direction with the flow path W interposed therebetween in the housing 100.

Each of the first charging module 201 and the second charging module 202 includes a charging case 210, an electromagnetic wave tube 220, and a power supply 230. The charging case 210 may be detachably attached to the housing 100 through the first attaching/detaching unit 400. An electromagnetic wave hole 211 may be formed in the charging case 210. At least an electromagnetic wave emitting portion of the electromagnetic wave tube 220 is exposed through the electromagnetic wave hole 211, so that the electromagnetic wave may be emitted through the electromagnetic wave hole 211.

Further, a voltmeter capable of monitoring a voltage of the power supply 230 and a voltage applied to the particle collecting module 500 may be installed in the charging case 210. In addition, an inclined surface for guiding the air introduced through the inlet 101 of the housing 100 toward the particle collecting module 500 may be formed at a front end of the charging case 210. The inclined surface may be inclined toward the center of the housing 100.

The electromagnetic wave tube 220 may be provided at the charging case 210 to emit electromagnetic waves toward the air moving in the flow path W. A position of the electromagnetic wave tube 220 mounted at the charging case 210 (i.e., a position corresponding to the electromagnetic wave hole 211) may be determined or adjusted based on the ionization efficiency of fine particles. Since the ionization efficiency of the fine particles may be determined according to a volume of a space to which the electromagnetic waves are irradiated and distances between the fine particles, the electromagnetic wave tube 220 may be positioned at a position where the irradiated electromagnetic waves can maximize the ionization efficiency of the fine particles. Further, a position at which the electromagnetic wave tube 220 is provided may be determined using artificial intelligence (AI).

The electromagnetic wave tube 220 emits electromagnetic waves to sterilize microorganisms and ionize fine particles in the air, thereby achieving a charge balance in the air. Here, the electromagnetic waves may be provided in the form of ultraviolet rays, X-rays, and extreme ultraviolet rays (EUV) through the control of wavelengths of the electromagnetic waves.

The electromagnetic wave tube 220 may irradiate to air electromagnetic waves generated when electrons emitted from an emitter (e.g., a carbon nanotube (CNT)-based emitter) collide with a target at high speed. The emitter may adjust wavelength of the electromagnetic wave to vary an intensity of the electromagnetic wave depending on a type of microorganism through a change (adjustment) of a tube voltage of the electromagnetic wave, and may adjust a measured energy (eV) for example. Here, the tube voltage may be understood as a maximum voltage given between an anode and a cathode of the electromagnetic wave tube 220.

In this way, when the tube voltage of the electromagnetic wave is adjusted, a wavelength, quality, dose, or the like of the electromagnetic wave generated from the electromagnetic wave tube 220 is changed, and thus, transmission power of the electromagnetic wave may be changed according to the type of microorganism. For example, when the wavelength of the electromagnetic wave generated from the electromagnetic wave tube 220 is adjusted to a wavelength of the ultraviolet light, nucleic acid of DNA of the microorganisms which is largely removed by the ultraviolet rays is destroyed or modified. Accordingly, the microorganisms may no longer be active, lose their ability to reproduce, and die. Of course, as factors affecting the sterilization effect, in addition to the wavelength of ultraviolet rays, there is an irradiation amount, humidity, a temperature, a wind speed, or the like. However, in general, the wavelength of ultraviolet rays may have the greatest effect.

The electromagnetic wave irradiated from the electromagnetic wave tube 220 may be controlled so as not to be irradiated toward the inlet 101 of the housing 100. For example, by adjusting the angle at which the electromagnetic wave is irradiated from the electromagnetic wave tube 220, the electromagnetic wave may be adjusted to be irradiated toward the particle collecting module 500. For example, the electromagnetic wave tube 220 may irradiate electromagnetic waves in a range between 0 to 90 degrees to be irradiated toward the particle collecting module 500. The electromagnetic wave tube 220 may receive power from the power supply 230. The power supply 230 may receive power from an external power source to provide power to the electromagnetic wave tube 220. The power supply 230 is installed inside the charging case 210, and may supply power to the electromagnetic wave tube 220 by converting the voltage of the external power source to a voltage suitable for the electromagnetic wave tube 220. The power supply 230 may supply power to the electromagnetic wave tubes 220 installed at both sides thereof, so that the power supply 230 can intensively use the limited space in the modular electrostatic precipitator. In addition, the installation of the power supply 230 in the modular electrostatic precipitator can be facilitated.

In the present embodiment, two electromagnetic wave tubes 220 are provided to be spaced apart in the charging case 210, the number and position of the electromagnetic wave tubes 220 are not limited thereto, and may vary as needed.

Figure 7:
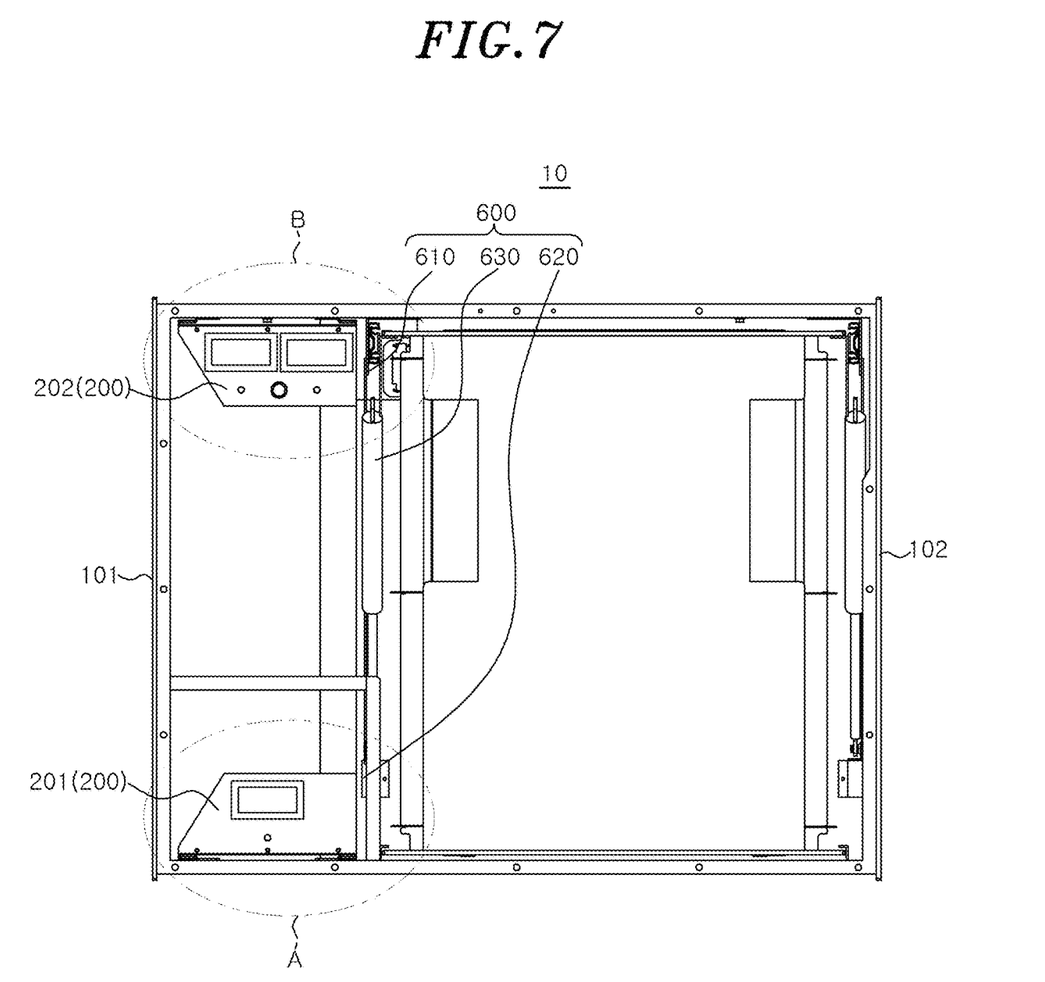
FIG. 7 is a view seen from line "A-A" of FIG. 3.
Figure 8:
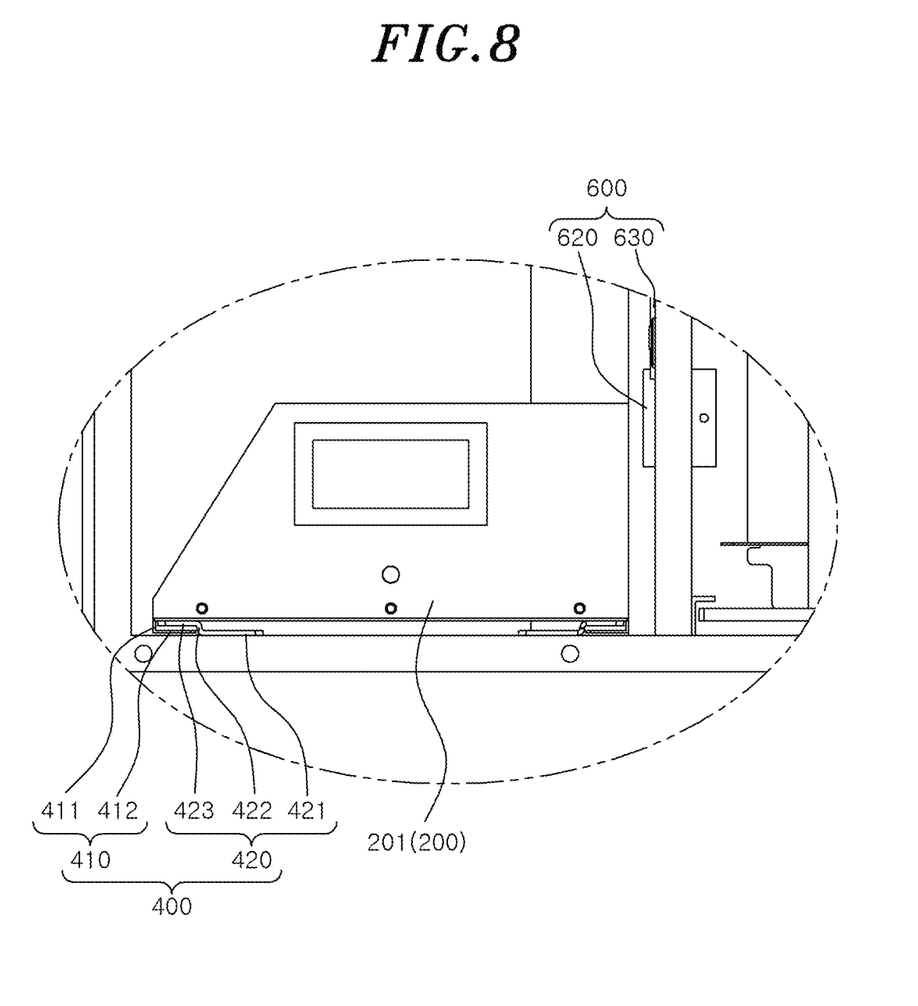
FIG. 8 is an enlarged view of part "A" of FIG. 7.

FIG. 7 is a view seen from line "A-A" of FIG. 3; FIG. 8 is an enlarged view of part "A" of FIG. 7; and FIG. 9 is an enlarged view of part "B" of FIG. 7.

Figure 9:
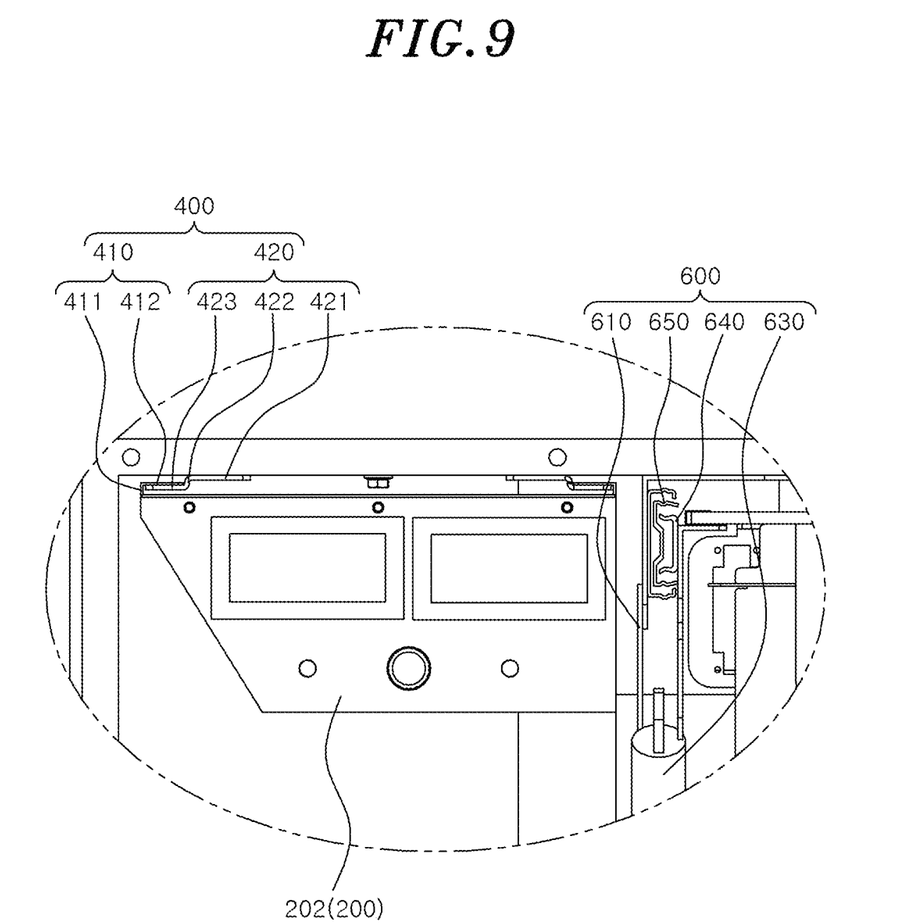
FIG. 9 is an enlarged view of part "B" of FIG. 7.

Referring to FIGS. 7 to 9, the first attaching/detaching unit 400 may attach/detach the charging module 200 to/from the housing 100. To this end, the first attaching/detaching unit 400 includes a sliding bracket 410 extending to be bent from a bottom portion of the charging module 200, and a guide rail 420 installed in the housing 100 to correspond to the sliding bracket 410. As an example, the sliding bracket 410 includes a vertical bracket portion 411 extending in a vertical direction from the edge of both sides of the charging module 200 and a horizontal bracket portion 412 that is bent from the vertical bracket portion 411 to extend toward the inner side of the charging module 200.

The guide rail 420 may guide the movement of the sliding bracket 410 when the charging module 200 is attached to and detached from the housing 100. The guide rail 420 includes a fixed rail portion 421 fixedly installed in the housing 100, a vertical rail portion 422 extending in a vertical direction from the fixed rail portion 421, and a horizontal rail portion 423 that is bent from the vertical rail portion 422 to extend toward the inner side of the charging module 200.

Accordingly, when the charging module 200 is attached to and detached from the housing 100, the sliding bracket 410 of the charging module 200 may be slidably moved along the guide rail 420 of the housing 100 in a direction to be attached to and detached from the housing 100 while the horizontal bracket portion 412 of the sliding bracket 410 is restricted to the horizontal rail portion 423 of the guide rail 420.

The particle collecting module 500 may collect fine particles in the air by using electrostatic force. To this end, the particle collecting module 500 includes a particle collecting plate 510, a particle collecting electrode 520, an upper plate 530, a lower plate 540, a reinforcing pipe 550, a gap reinforcement bar 560, and a side plate 570.

The particle collecting plate 510 may include a plurality of particle collecting plates 510 provided for collecting ionized fine particles (including fine dust) in the charging module 200. The plurality of particle collecting plates 510 may be disposed in the housing 100 while being spaced apart from each other by a predetermined distance in a width direction of the flow path W.

A voltage (current) applied from an external power source to the particle collecting electrode 520 may be applied to the plurality of particle collecting plates 510 to generate an electrostatic force on the particle collecting plates 510. When the ionized fine particles are moved between the plurality of particle collecting plates 510 spaced apart, the ionized fine particles are collected on the plurality of particle collecting plates 510 by the electrostatic force generated thereon. Accordingly, the air passing through the plurality of particle collecting plates 510 can be purified since fine particles are removed therefrom, and the purified air can be discharged through the outlet 102 of the housing 100 to the outside of the particle collecting module 500, that is, to the outside of the housing 100.

The upper plate 530 may be positioned at the top of the particle collecting module 500, and may be connected to the lower plate 540 through the reinforcing pipe 550. Upper portions of the plurality of particle collecting plates 510 may be coupled to the upper plate 530. Upper slits 531 through which at least part of the upper portions of the plurality of particle collecting plates 510 pass may be formed in the upper plate 530. The particle collecting electrode 520 may be electrically connected to a portion of the upper portions of the particle collecting plates 510 protruding through the upper slits 531.

The lower plate 540 may be positioned at the bottom of the particle collecting module 500, and may be connected to the upper plate 530 through the reinforcing pipe 550. Lower portions of the plurality of particle collecting plates 510 may be coupled to the lower plate 540. Lower slits 541 through which at least part of the lower portions of the plurality of particle collecting plates 510 pass may be formed in the lower plate 540. The particle collecting electrode 520 may be electrically connected to a portion of the lower portions of the particle collecting plates 510 protruding through the lower slits 541.

The reinforcing pipe 550 may include a plurality of reinforcing pipes 550 provided between the upper plate 530 and the lower plate 540 to connect them. For example, upper ends of the plurality of reinforcing pipes 550 may be connected to both side end portions of the upper plate 530, and lower ends of the plurality of reinforcing pipes 550 may be connected to both side end portions of the lower plate 540.

The gap reinforcing bar 560 may include a plurality of gap reinforcing bars 560 which fix both side edges of the plurality of particle collecting plates 510. Since the gap reinforcing bars 560 are fitted and coupled to both side edges of the particle collecting plates 510, the distance between the plurality of particle collecting plates 510 can be maintained constant.

The second attaching/detaching unit 600 may attach/detach the particle collecting module 500 to/from the housing 100. The second attaching/detaching unit 600 may include a particle collecting bracket 610, a housing bracket 620, an operating cylinder 630, a particle collection rail 640, and a housing rail 650.

The particle collecting bracket 610 may be a mounting bracket installed on one side of an upper side of the particle collecting module 500. An upper end of the operating cylinder 630 may be hingedly connected to the particle collecting bracket 610. The housing bracket 620 may be mounted to a lower inner portion of the housing 100. A lower end of the operating cylinder 630 may be hingedly connected to the housing bracket 620.

The operating cylinder 630 may be connected between the particle collecting bracket 610 and the housing bracket 620. The operating cylinder 630 may provide a moving force for moving the particle collecting module 500 into and out of the housing 100 when the particle collecting module 500 is attached to and detached from the housing 100. As an example, the operating cylinder 630 may be a gas (pneumatic) cylinder that provides a moving force to the particle collecting module 500 using gas (pneumatic) pressure.

For example, the upper end of the operating cylinder 630 may be hingedly connected to one end of the particle collecting bracket 610, and the lower end of the operating cylinder 630 may be hingedly connected to a center of the housing bracket 620. Accordingly, when the charging module 200 is attached to and detached from the housing 100, the operating cylinder 630 may be rotated along an arc trajectory with the center of the housing bracket 620 as a rotation center.

The particle collection rail 640 may be mounted at an upper portion of the particle collecting module 500 to extend in the attachment/detachment direction of the particle collecting module 500. One side of the particle collection rail 640 may be fixedly installed at the upper portion of the particle collecting module 500, and the other side of the particle collection rail 640 may be coupled to the housing rail 650 to be slidably moved along the housing rail 650.

The housing rail 650 may be installed at an upper portion of the housing 100 to correspond to the particle collection rail 640. The housing rail 650 may guide the particle collection rail 640 in the attachment/detachment direction of the particle collecting module 500 by supporting the particle collection rail 640 to be slidably moved when the particle collecting module 500 is attached to and detached from the housing 100.

Figure 10:
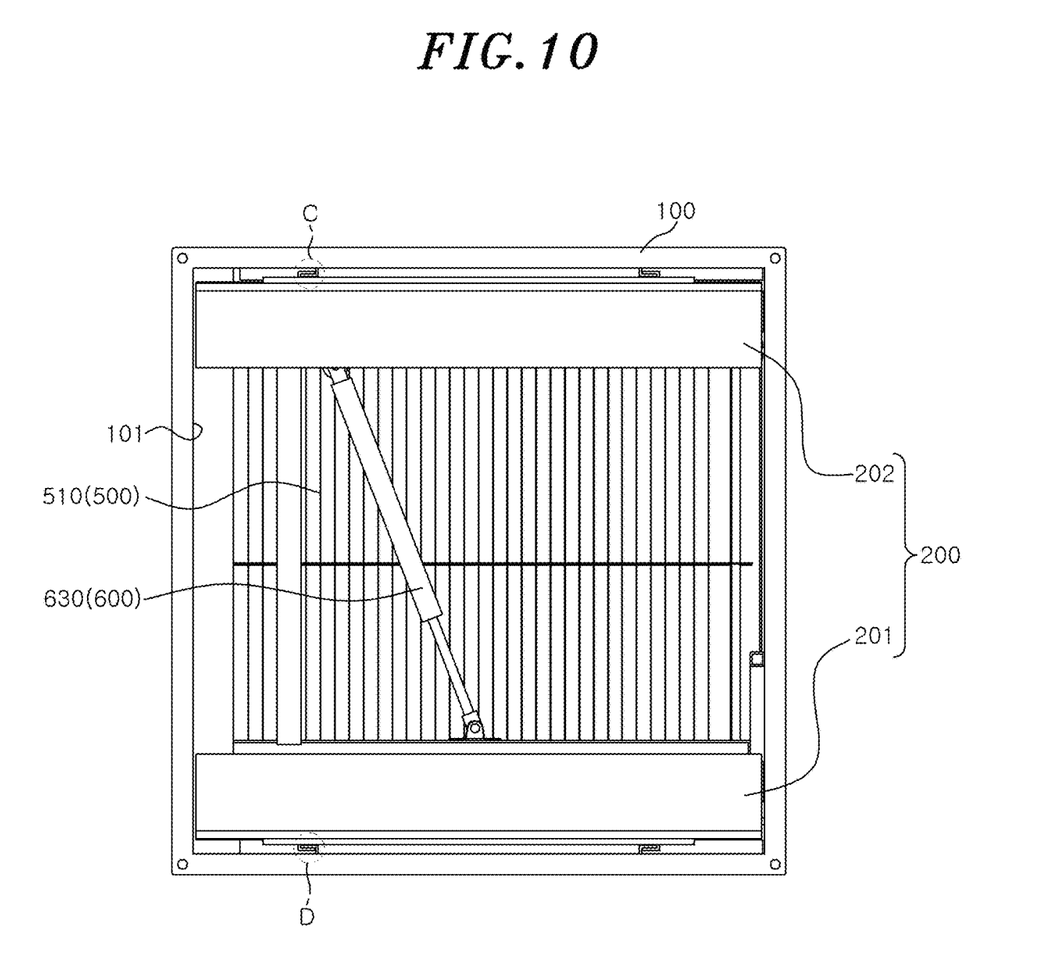
FIG. 10 is a front view showing the front side of a modular electrostatic precipitator according to a second embodiment of the present disclosure.
Figure 11:
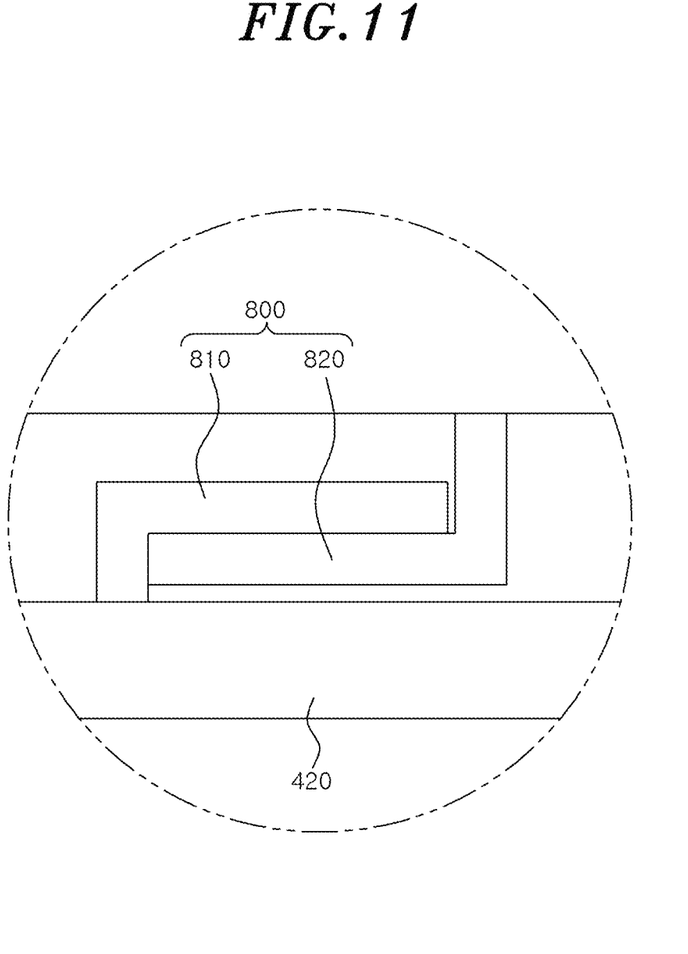
FIG. 11 is an enlarged view of part "C" of FIG. 10.

FIG. 10 is a front view showing the front side of a modular electrostatic precipitator according to a second embodiment of the present disclosure; FIG. 11 is an enlarged view of part "C" of FIG. 10; and FIG. 12 is an enlarged view of part "D" of FIG. 10.

Figure 12:
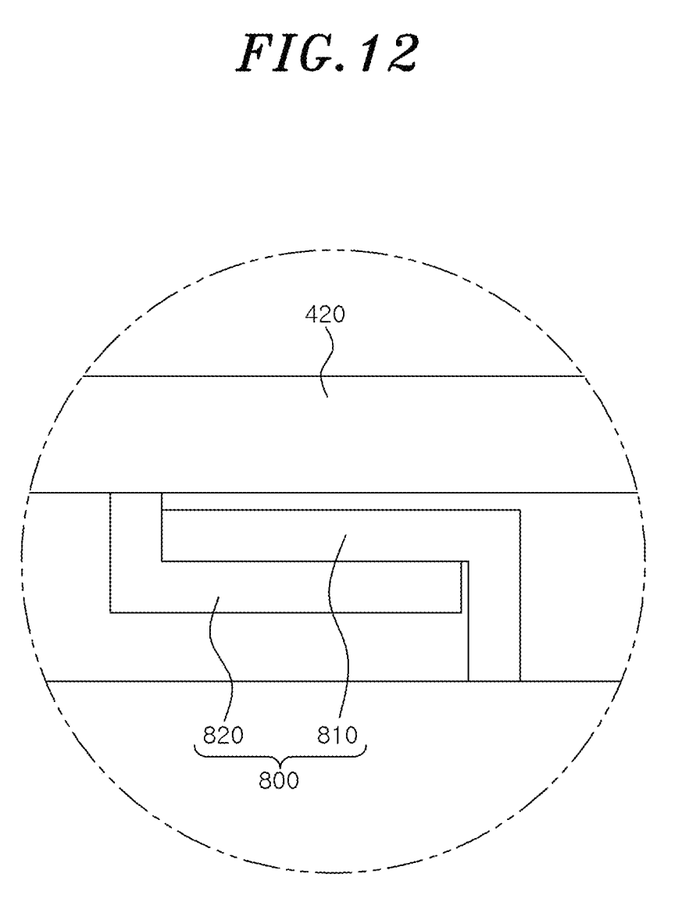
FIG. 12 is an enlarged view of part "D" of FIG. 10.

Referring to FIGS. 10 to 12, the sliding unit 800 may slide the charging module 200 in the width direction of the flow path W along which the air in the housing 100 moves. The sliding unit 800 may include a first guide rail 810 installed at the guide rail 420 of the first attaching/detaching unit 400 and a second guide rail 820 installed at the housing 100. The first guide rail 810 and the second guide rail 820 may be bent in a 'L' or '⁻⎟' shape so that they are restricted to each other in the longitudinal direction of the flow path W.

Accordingly, when the position of the charging module 200 in the width direction of the flow path W in the housing 100 is determined based on the ionization efficiency of the fine particles contained in the air, the first guide rail 810 installed at the guide rail 420 guides the movement of the charging module 200 in the width direction of the flow path W in the housing 100 while being restricted by the second guide rail 820 of the housing 100, so that the charging module 200 can be moved in the width direction of the flow path W in the housing 100 to be located at a position where the efficiency of ionization of the fine particles is maximized.

As described above, detailed descriptions of the present disclosure are made by the embodiments with reference to the accompanying drawings, but since the above-described embodiments have only been described with preferred examples of the present disclosure, the present disclosure is limited only to the above embodiments. The scope of the right of the present disclosure should be understood as the following claims and their equivalent concepts.

What is claimed is:

1. A modular electrostatic precipitator comprising:
   a housing providing a flow path through which air is moved;
   a charging module configured to emit electromagnetic waves to the air;
   a first attaching and detaching unit configured to attach and detach the charging module to and from the housing;
   a particle collecting module configured to collect particles in the air based on an electrostatic force; and
   a second attaching and detaching unit configured to attach and detach the particle collecting module to and from the housing,
   wherein the charging module includes:
      a charging case detachably mounted to the housing through the first attaching and detaching unit;
      an electromagnetic wave tube provided in the charging case, wherein the electromagnetic tube comprises a carbon nanotube-based emitter configured to emit electromagnetic waves to ionize fine particles in the air traveling through the flow path; and
      a power supply, installed in the charging case, configured to supply power to the electromagnetic wave tube, and
   wherein a portion of the first attaching and detaching unit extends from the charging case.

2. The modular electrostatic precipitator of claim 1, wherein the charging module is mounted on a side of an inlet of the housing through which the air is introduced,
   wherein the particle collecting module is mounted on a side of an outlet of the housing through which the air is discharged, and
   wherein fine particles in the air introduced into the housing are configured to be ionized by the charging module, and the ionized fine particles are configured to be collected by the electrostatic force on a particle collecting plate of the particle collecting module.

3. The modular electrostatic precipitator of claim 1, wherein the first attaching and detaching unit further includes:
   a sliding bracket extending to be bent from a lower portion of the charging module; and
   a guide rail configured to guide a movement of the sliding bracket when the charging module is attached to and detached from the housing, the guide rail being installed at the housing to correspond to the sliding bracket.

4. The modular electrostatic precipitator of claim 3, wherein the sliding bracket includes:
   a vertical bracket portion vertically extended in each edge of both sides of a bottom portion of the charging module; and
   a horizontal bracket portion bent and extended from the vertical bracket portion toward an inner side of the charging module.

5. The modular electrostatic precipitator of claim 4, wherein the guide rail includes:
   a fixed rail portion fixedly installed at the housing;
   a vertical rail portion extending in a vertical direction from the fixed rail portion; and
   a horizontal rail portion bent and extended from the vertical rail portion toward the inner side of the charging module to enable sliding movement of the horizontal bracket portion while being restricted to the horizontal rail portion.

6. The modular electrostatic precipitator of claim 1, wherein the second attaching and detaching unit includes:
   a particle collecting bracket installed at an upper portion of the particle collecting module; and
   a housing bracket mounted at a lower portion of the housing.

7. The modular electrostatic precipitator of claim 6, wherein the second attaching and detaching unit further includes:
   an operating cylinder connected between the particle collecting bracket and the housing bracket to apply a moving force to the particle collecting module in an attachment/detachment direction of the particle collecting module when the particle collecting module is attached to and detached from the housing.

8. The modular electrostatic precipitator of claim 7, wherein an upper end of the operating cylinder is hingedly coupled to one end of the particle collecting bracket, and a lower end of the operating cylinder is hingedly coupled to a center of the housing bracket, so that the operating cylinder is rotated along an arc trajectory with the center of the housing bracket as a rotation center when the charging module is attached to and detached from the housing.

9. The modular electrostatic precipitator of claim 6, wherein the second attaching and detaching unit further includes:
   a particle collection rail mounted at an upper portion of the particle collecting module to extend in an attachment/detachment direction of the particle collecting module; and
   a housing rail installed at an upper portion of the housing to correspond to the particle collection rail, the housing rail supporting the particle collection rail to be slidably moved when the particle collecting module is attached to and detached from the housing.

10. The modular electrostatic precipitator of claim 1, wherein the particle collecting module includes:
    a plurality of particle collecting plates disposed to be spaced apart from each other in a width direction of the flow path, ionized fine particles being moved between the plurality of particle collecting plates; and
    a particle collecting electrode configured to apply power to the particle collecting plates to generate an electrostatic force on the particle collecting plates.

11. The modular electrostatic precipitator of claim 10, wherein the particle collecting module further includes:
    an upper plate to which upper portions of the plurality of particle collecting plates are coupled;
    a lower plate to which lower portions of the plurality of particle collecting plates are coupled; and
    reinforcing pipes connected between opposite end portions of the upper plate and opposite end portions of the lower plate.

12. The modular electrostatic precipitator of claim 11, wherein the particle collecting module further includes:
    gap reinforcement bars that fix both side edges of the plurality of particle collecting plates so that a distance between the plurality of the adjacent particle collecting plates is maintained constant.

13. The modular electrostatic precipitator of claim 11, wherein an upper slit through which at least part of the upper portions of the plurality of particle collecting plates pass is formed in the upper plate,
    wherein a lower slit through which at least part of the lower portions of the plurality of particle collecting plates pass is formed in the lower plate, and
    wherein the particle collecting electrode is electrically connected to the at least parts of the upper portion and the lower portion of the particle collecting plates protruding through the upper slit and the lower slit.

14. The modular electrostatic precipitator of claim 1, wherein the charging module is configured to sterilize microorganisms in the air and ionizes the fine particles in the air, and
    wherein the particle collecting module is configured to remove the ionized microorganisms through electrical attraction by the electrostatic force.

15. The modular electrostatic precipitator of claim 1, wherein the charging module comprises:
    a first charging module installed at a lower portion on a side of an inlet in the housing; and
    a second charging module installed at an upper portion on the side of the inlet in the housing.

16. The modular electrostatic precipitator of claim 15, wherein the first charging module and the second charging module are disposed to face each other in an up-down direction with the flow path interposed therebetween in the housing.

* * * * *